Nov. 13, 1962     T. R. SPECHT     3,064,220

MAGNETIC CORE STRUCTURE

Filed Dec. 5, 1958     2 Sheets-Sheet 1

WITNESSES:
Bernard R. Gieguey
Clement L. McHale

INVENTOR
Theodore R. Specht
BY
A.T. Stratton
ATTORNEY

Nov. 13, 1962 T. R. SPECHT 3,064,220
MAGNETIC CORE STRUCTURE
Filed Dec. 5, 1958 2 Sheets-Sheet 2

United States Patent Office 3,064,220
Patented Nov. 13, 1962

3,064,220
MAGNETIC CORE STRUCTURE
Theodore R. Specht, Sharon, Pa., assignor to Westinghouse Electric Corporation, East Pittsburgh, Pa., a corporation of Pennsylvania
Filed Dec. 5, 1958, Ser. No. 778,369
19 Claims. (Cl. 336—217)

This invention relates to electrical inductive apparatus such as transformers and, more particularly, to magnetic core structures for use in such apparatus.

In certain types of electrical inductive apparatus, such as transformers, a magnetic core structure is provided which includes a plurality of stacked layers of laminations formed from magnetic strip material, preferably a material having at least one preferred direction of orientation substantially parallel to the longitudinal dimension of said material. In order to obtain more efficient joints between the laminations, a conventional magnetic core of this type often employs combination butt and lap joints adjacent to the corners of the core structure in which the adjoining edges of the laminations are cut at an angle with respect to the direction of the orientation of the strip material in order to obtain a higher permeability of the core structure and lower losses in said core structure. An example of a conventional core of the type described is shown in U.S. Patent 2,300,964, issued November 3, 1942, on an application of H. V. Putman and assigned to the assignee of the present application. The latter patent will hereinafter be referred to as the Putman patent. In general, the joints in a magnetic core constructed in accordance with the teachings of the Putman patent are divided into two groups at each corner of said core, the joints of one group being displaced from and parallel to the joints of the other group to obtain combination butt and lap joints. In other words, the joints at each corner of a magnetic core of the type disclosed in the Putman patent are divided or distributed in two substantially parallel planes.

One disadvantage of a conventional core of the type disclosed in the Putman patent relates to the lower limits of the exciting current and the associated losses which can ordinarily be obtained in such a core. A second disadvantage of a conventional core of the type described is that a certain amount of scrap material results from the punching or cutting of the magnetic strip material from which the laminations of such a core are formed. It is, therefore, desirable to provide an improved magnetic core structure of the type described which requires a lower exciting current and has reduced losses associated with the core compared to a conventional magnetic core of the same general type. In addition, it is desirable that an improved core more readily lend itself to a reduced amount of scrap material which results from the punching or cutting of the magnetic strip material from which the laminations of the core are formed.

It is an object of this invention to provide a new and improved magnetic core structure for electrical inductive apparatus, such as transformers.

Another object of this invention is to provide a new and improved magnetic core structure including a plurality of stacked layers of laminations formed from magnetic strip material having at least one preferred direction of orientation.

A further object of this invention is to provide a magnetic core structure including a plurality of stacked layers of laminations and employing combination butt and lap joints adjacent to the corners of a substantially rectangular core structure in which the flux density in said joints is reduced as well as the exciting current and losses associated with said magnetic core structure.

A still further object of this invention is to provide a magnetic core structure including a plurality of stacked layers of laminations formed from magnetic strip material having at least one preferred direction of orientation in which the amount of scrap resulting from the punching or cutting of said laminations from said material is reduced.

Other objects of the invention will in part be obvious and will in part appear hereinafter.

For a fuller understanding of the nature and objects of the invention, reference should be had to the following detailed description taken in connection with the accompanying drawing in which.

Figure 1:
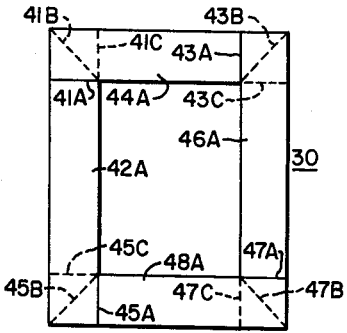
FIGS. 1, 2 and 3 show parts of a magnetic core structure illustrating a first embodiment of the invention.
Figure 2:
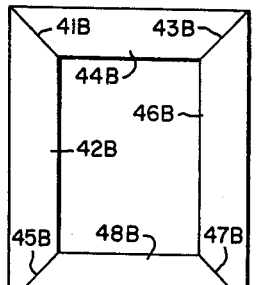
Figure 3:
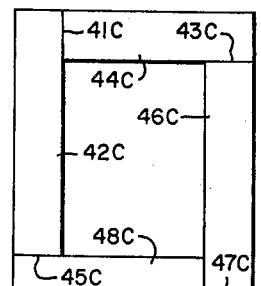

Referring now to the drawings and FIGURES 1, 2 and 3 in particular, there is illustrated generally a magnetic core 30 of the stacked type. The magnetic core 30 comprises one or more groups of layers of assembled laminations. Each group includes a plurality of at least three stacked layers of laminations assembled to form a substantially rectangular core, having in this particular case a substantially rectangular window.

In particular, the magnetic core 30 includes one or more groups of layers of laminations formed from a magnetic strip material having at least one preferred direction of orientation lengthwise of said strip material or substantially parallel to the sides of said strip material. Each of said groups includes at least three layers of laminations such as the layers 51, 52 and 53 shown in FIGS. 1, 2 and 3, respectively. In general, each of the layers 51, 52 and 53 includes at least four laminations assembled around a substantially rectangular window with the adjoining edges of said laminations substantially aligned.

More specifically, the layer 51 includes first and second yoke laminations 44A and 48A, respectively, and first and second leg laminations 42A and 46A, respectively. The ends of each of the laminations included in the layer 51 are cut substantially perpendicular or at a right angle with respect to the direction of orientation of the strip material from which said laminations are formed. The joints, therefore, between the adjoining edges of the laminations included in the layer 51 are substantially perpendicular to the direction of orientation of the strip material from which one of the meeting laminations at each of the corners of the magnetic core 30 is formed as indicated at 41A, 43A, 45A and 47A, respectively.

The diagonally opposite joints at the corners of the magnetic core 30 are substantially perpendicular to the magnetic strip material from which either the yoke laminations or the leg laminations of the layer 51 are formed. The joints indicated at 41A and 47A are substantially perpendicular to the direction of orientation of the strip material from which the leg laminations 42A and 46A are formed. The joints indicated at 43A and 45A are substantially perpendicular to the direction of orientation of the strip material from which the first and second yoke laminations 44A and 48A, respectively, are formed. Similarly to the layer 51, the layer 53 includes first and second yoke laminations 44C and 48C, respectively, and first and second leg laminations 42C and 46C, respectively, the ends of each of said laminations being cut substantially at a right angle with respect to the direction of orientation of the strip material from which said laminations are formed. Similarly, also to the layer 51, the joints between the adjoining edges of the laminations included in the layer 53 are substantially perpendicular with respect to the direction of orientation of the strip material from which one of the meeting laminations is formed. The diagonally opposite joints of the layer 53 indicated at 41C and 47C are substantially perpendicular to the direction of orientation of the strip material from which the yoke laminations 44C and 48C are formed and the diagonally opposite joints indicated at 44C and 45C are substantially perpendicular to the direction of orientation of the strip material from which the leg laminations 42C and 46C are formed. It is to be noted that the corresponding joints at each corner of the magnetic core 30 between the adjoining edges of the laminations included in the layers 51 and 53, respectively, are substantially perpendicular to each other. For example, the joint indicated at 41A in the layer 51 is substantially perpendicular to the corresponding joint 41C in the layer 53 at the same corner of the magnetic core 30.

The third layer 52 also includes first and second yoke laminations 44B and 48B, respectively, and first and second leg laminations 42B and 46B, respectively, which are similarly formed from magnetic strip material having a preferred direction of orientation lengthwise of said strip material. The ends of the laminations included in the layer 52, however, are cut diagonally or at an oblique angle, preferably an angle of substantially 45°, with respect to the direction of orientation or with respect to the longitudinal dimension of the magnetic strip material from which said laminations are formed. The joints between the adjoining edges of the laminations included in the layer 52 at the corners of the core 30 as indicated at 41B, 43B, 45B and 47B, respectively, are, therefore, disposed diagonally or at an oblique angle with respect to the direction of orientation of the strip material from which the meeting laminations of said layer are formed when the laminations of the layer 52 are assembled with the adjoining edges of said laminations substantially aligned around a substantially rectangular window as shown in FIGURE 2.

As previously mentioned, the magnetic core 30 may include one or more groups of stacked layers of laminations, each of said groups including at least three layers of laminations such as the layers 51, 52 and 53 shown in FIGS. 1, 2 and 3, respectively. After the layers of laminations included in the magnetic core 30 are assembled and stacked as previously described, the joints between the adjoining edges of the laminations in each of the layers included in said core are overlapped by the laminations in the adjacent layers. For example, the joint 41B in the layer 52 would be overlapped by the yoke lamination 44A of the layer 51 and by the leg lamination 42C of the layer 53. The joints between the adjoining edges of the laminations included in each of the layers 51, 52 and 53 are substantially butt type joints and the overlapping of each of the joints by the laminations in the adjacent layers results in combination butt and lap joints at each of the corners of the magnetic core 30. The amount or area of the overlapping of the joints between the adjoining edges of the laminations in each of the layers of the core 30 is increased compared to the overlap provided in the core construction disclosed in the Putman patent. It is to be understood that the layers of laminations included in each of the groups which make up the magnetic core 30 may be stacked in a recurring or repeating sequence or order in each of said groups or the order of the stacking of the different layers may be modified in different groups in a particular application.

Considering each corner of the magnetic core 30, which may include one or more groups of layers such as the layers 51, 52 and 53, the joints between the adjoining edges of the laminations included in the layers of each of said groups are divided or distributed into at least three planes. For example, considering the upper left-hand corner of the magnetic core 30, the three planes in which the joints at said corner are divided or distributed are indicated by the joints 41A, 41B and 41C, respectively. The first plane as indicated by the joint 41A is substantially perpendicular to the direction of orientation of the strip material from which the first leg laminations 42A, 42B and 42C are formed. The second plane in which the joints at said corner lie is indicated by the joint 41C and is substantially perpendicular to the direction of orientation of the strip material from which the first yoke laminations 44A, 44B and 44C are formed. The third plane in which the joints at said corner lie is indicated by the joint 41B and is disposed diagonally or at an oblique angle, preferably an angle of substantially 45°, with respect to the direction of orientation of the strip material from which said first yoke laminations and said first leg laminations of the magnetic core 30 are formed. It is to be noted that the first and second planes of said three planes are disposed substantially perpendicular to each other and that the third plane is disposed diagonally or at an oblique angle, preferably an angle of substantially 45°, with respect to both said first and second planes.

Since the joints between the meeting laminations at each corner of the magnetic core 30 are divided or distributed into at least three planes, only one lamination out of three in successive layers in any particular plane of said three planes at each corner of said core is cut or interrupted, compared to one out of two laminations in a core joint at each corner of a core as disclosed in the Putman patent. This means that the effective area of the magnetic material at each corner joint in a core construction as disclosed is approximately one-third greater than the effective area of the magnetic material in a core joint at each corner of a core as disclosed in the Putman patent. The effective flux density, therefore, in the corner joints of a core as disclosed is, therefore, reduced as well as the exciting current and the associated losses associated with said core.

It is to be understood that the magnetic core 30 may be applied as a single phase magnetic core of the core form type in which windings or coils would be inductively disposed on one or both of the leg members formed by the stacked first and second leg laminations, respectively, included in said core. It is also to be understood that the magnetic core 30 may also be applied in a single phase core of the shell form type in which two magnetic core sections, each similar to the magnetic core 30, would be disposed side by side with windings disposed on a common center leg member having a width substantially twice the width of two outer leg members.

It is important to note that the laminations included in the magnetic core 30 can be formed from magnetic strip material by punching or cutting in an essentially scrapless manner. This is because the ends of said laminations are cut either substantially perpendicular to the direction of orientation of the strip material or at a preferred angle of substantially 45°, which may be modified in a particular application to be another oblique angle.

Figure 4:
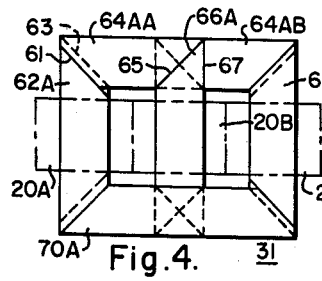
FIG. 4 is a top plan view of a core and coil assembly, with the windings shown in phantom, illustrating a second embodiment of the invention.

Referring now to FIGURE 4, there is illustrated a core and coil assembly including the magnetic core 40 and three phase windings 20A, 20B and 20C, as indicated in dotted outline, which would be inductively disposed on said core. In general, the magnetic core 40 includes a plurality of stacked layers of laminations formed from magnetic strip material having a preferred direction lengthwise of said material or substantially parallel to the sides of said material. The laminations of the respective layers included in the magnetic core 40 are assembled with the adjoining edges substantially aligned to form a substantially rectangular core having two substantially rectangular windows. In general, each of the layers included in the magnetic core 40 includes three leg laminations and yoke laminations connecting the ends of said leg laminations to form a substantially rectangular core having two substantially rectangular windows. The joints between the adjoining edges of the laminations at the outer corners of the magnetic core 40 are similar to the joint construction disclosed in the Putman patent and the teachings of the invention are applied particularly to the joints between the center leg laminations and the associated yoke laminations.

Figure 5:
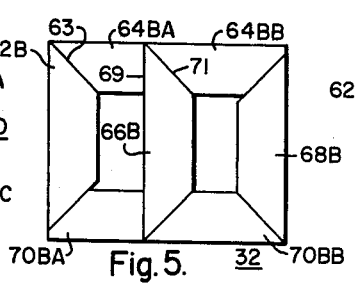
FIGS. 5 through 9 illustrate parts of the magnetic core structure included in the core and coil assembly shown in FIG. 4.
Figure 6:
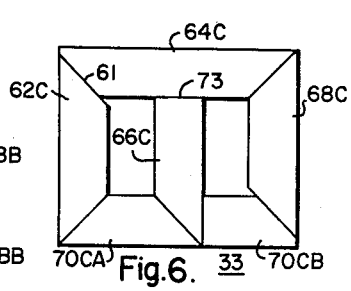

In particular, the magnetic core 40 includes one or more groups of layers of laminations, each of said groups including at least three layers of laminations such as the layers 31, 32 and 33 shown in FIGS. 4, 5 and 6, respectively. The first layer 31 includes first and second outer leg laminations 62A and 68A, respectively, a center leg lamination 66A, a first yoke lamination including first and second yoke lamination portions 64AA and 64AB, respectively, and a second yoke lamination 70A. The ends of the first and second outer leg laminations 62A and 68A are cut diagonally or at an oblique angle, preferably at an angle of substantially 45°, with respect to the direction of orientation of the strip material from which said laminations are formed. Similarly the outer ends of the first and second yoke lamination portions 64AA and 64AB, respectively, are also cut diagonally, preferably at an angle of substantially 45°, with respect to the direction of orientation of the strip material from which said yoke lamination portions are formed. Similarly, the layers 32 and 33 include first and second outer leg laminations 62B and 68B and 62C and 68C, respectively, center leg laminations 66B and 66C, respectively, first yoke laminations including the first and second yoke lamination portions 64BA and 64BB in the layer 32 and 64C in the layer 33, respectively, and second yoke laminations each including first and second yoke lamination portions 70BA and 70BB and 70CA and 70CB, respectively. Similarly to the layer 31, both ends of the first and second outer leg laminations 62B and 68B, respectively, the outer ends of the first and second yoke lamination portions 64BA and 64BB, respectively, of the first yoke lamination and the outer end of the first and second yoke lamination portions 70BA and 70BB, respectively, of the second yoke lamination of the layer 32, and both ends of the first and second outer leg laminations 62C and 68C, respectively, the ends of the first yoke lamination 64C and the outer ends of the first and second yoke lamination portions 70CA and 70CB of the second yoke lamination of the layer 33, are all cut diagonally or at an oblique angle, preferably an angle of substantially 45°, with respect to the direction of orientation of the magnetic strip material from which said laminations are formed.

Considering the joints between the adjoining edges of the laminations in the layers 31, 32 and 33 at each outside corner of the magnetic core 40, the joints between the adjoining edges of the meeting laminaions in successive alternate layers at each corner of the core 40 are parallel to each other and offset or displaced from one another to provide an area of overlap between the two joints in alternate layers at each corner of said core. For example, the joint between the adjoining edges of the first outer leg lamination 62B and the first yoke lamination portion 64BA of the first yoke lamination of the layer 32 extends along a diagonal line from the corner of the left-hand window of the core 40 to the nearest outside corner of the core 40 as indicated at 63. Referring to FIG. 4, the joint between the first outer leg lamination 62A and the first yoke lamination portion 64AA of the first yoke lamination of the layer 31 is along a continuous straight line as indicated at 61 which is parallel to and displaced from the joint 63, so that the joint 61 extends from a point offset from a corner of the left-hand window to a point which is offset from the nearest outside corner of the core 40. The joints at the other corners of the core 40 are similarly arranged to provide combination butt and lap joints of the type disclosed in the Putman patent. In other words, the joints between the adjoining edges of the meeting laminations at each corner of the core 40 are divided or distributed in two substantially parallel planes, as indicated by the joints 61 and 63 in FIG. 4, which are diagonally disposed with respect to the strip material from which each of the meeting laminations at each of the corners of the core 40 are formed.

One end of each of the center leg laminations 66A and 66C of the layers 31 and 33, respectively, and both ends of the center leg lamination 66B of the layer 32 are cut diagonally or at an oblique angle, preferably an angle of substantially 45°, with respect to the direction of orientation of the strip material from which said laminations are formed. The other end of each of the center leg laminations 66A and 66C of the layers 31 and 33, respectively, are cut substantially perpendicular with respect to the direction of orientation of the strip material from which said laminations are formed. The inner ends of the second yoke lamination portion 64AB, the first yoke lamination portion 64BA, the first yoke lamination portion 70BA and the second yoke lamination portion 70CB are also cut substantially perpendicular to the direction of orientation of the strip material from which said lamination portions are formed. The inner ends of the first yoke lamination portion 64AA, the second yoke lamination portions 64BB, 70BB and 70CA are all cut at an oblique angle, preferably at an angle of substantially 45°, with respect to the direction of orientation of the strip material from which said laminations are formed.

Considering only the joints between the adjoining edges of the center leg laminations and the associated yoke laminations of the layers 31, 32 and 33, said joints are divided or distributed into at least five different planes at each end of the core 40. For example, considering only the joints between the upper ends of the center leg laminations 66A, 66B and 66C and the associated first yoke laminations, a first plane, as indicated at 65 for the joint between the adjoining edges of the first yoke lamination portion 64AA and the center leg lamination 66A of the layer 31, is disposed at an oblique angle with respect to the direction of orientation of the strip material from which said laminations are formed. A second plane as indicated at 67 for the joint between the adjoining edges of the center leg lamination 65 and the second yoke lamination portion 64AB is substantially perpendicular to the direction of orientation of the strip material from which said yoke lamination portion is formed. A third plane as indicated at 69 for the joint between the adjoining edges of the first yoke lamination portion 64BA and the center leg lamination 66B of the layer 32 is substantially perpendicular to the direction of orientation of the strip material from which said first yoke lamination portion is formed. A fourth plane as indicated at 71 for the joint between the adjoining edges of the center leg lamination 66B and the second yoke lamination portion 64BB of the layer 32 is at an oblique angle with respect to the direction of orientation of the magnetic strip material from which said laminations are formed.

A fifth plane as indicated at 73 for the joint between the adjoining edges of the first yoke lamination 64C and the center leg lamination 66C of the layer 33 is substantially perpendicular to the direction of orientation of the strip material from which said center leg lamination is formed. It is to be noted that the second and third planes as indicated at 67 and 69, respectively, are substantially parallel to each other and displaced from each other by the width of the center leg laminations of the layers 31, 32 and 33. The latter two planes are also both substantially perpendicular to the fifth plane as indicated at 73. The slopes of the first and fourth oblique planes are in opposite directions and said planes are substantially perpendicular to each other as well as being preferably disposed at an angle of 45° with respect to each of the second, third and fifth planes just described. The joints between the center leg laminations of the layer 31, 32 and 33 with the associated yoke laminations at the other end of the magnetic core 40 are similarly arranged.

The manner in which the joints between the center leg laminations of the magnetic core 40 and the associated yoke laminations are arranged as previously described provides an overlapping of the joints between each of said center leg laminations and the associated yoke laminations in each of the layers 31, 32 and 33 by the laminations in the adjacent layers, which results in combination butt and lap joints between said center leg laminations and the associated yoke laminations of said layers.

Figure 7:
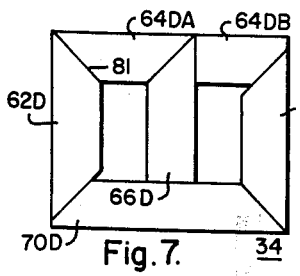
Figure 8:
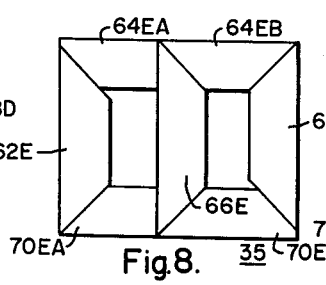
Figure 9:
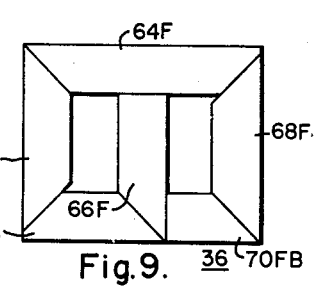

In applications where more than one group of layers of laminations similar to the laminations 31, 32 and 33 shown in FIGS. 4, 5 and 6, respectively, are to be included in a core as disclosed, it is advisable that the joints between the adjoining edges of the meeting laminations in the layers of the alternate groups be offset or displaced from the joints between the adjoining edges of the laminations at the corresponding corners of the corresponding layers in the other groups. Referring to FIGURES 7, 8 and 9, the layers 34, 35 and 36 are similar to the layers 31, 32 and 33, respectively, except that the joints between the adjoining edges of the outer leg laminations and the associated yoke laminations of the layers 34, 35 and 36 are displaced or offset from the joints between the adjoining edges of the meeting laminations at the corresponding outside corners of the layers 31, 32 and 33, respectively. Similarly to the layers 31 through 33, the layers 34 through 36 include the first and second outer leg laminations 62D and 68D, respectively, to 62F and 68F, respectively, and the center leg laminations 66D to 66F, respectively, connecting the ends of the leg laminations of the layers 34 through 36 to form substantially rectangular windows in each of said layers. The layer 34 includes a first yoke lamination comprising the first and second yoke lamination portions 64DA and 64DB and a second yoke lamination 70D. Similarly, the layers 35 and 36 include the first yoke laminations comprising the first and second yoke lamination portions 64EA and 64EB in the layer 35 and 64F in the layer 36, respectively, and the second yoke laminations including the first and second yoke lamination portions 70EA and 70EB and 70FA and 70FB, respectively.

The layers 34, 35 and 36 would, therefore, comprise a group of at least three layers which would be stacked alternately with groups each having at least three layers similar to the layers 31, 32 and 33. The manner in which the joints between the adjoining edges of the outer leg laminations and the associated yoke laminations in the corresponding layers of said groups at the same corner of a magnetic core including at least one group each of the types described is shown best by comparing the corresponding layers 31 and 34 as illustrated in FIGS. 4 and 7, respectively. The joint between the adjoining edges of the outer leg lamination 62D and the outer end of the first yoke lamination portion 64DA of the layer 34 extends from a corner of the left window to the nearest outside corner of a magnetic core including the layer 34.

As previously discussed, the joint 61 between the corresponding laminations of the layer 31 is along a line which extends from a point offset from the corner of the left window to a point which is offset from the nearest outside corner of the magnetic core 40. It is to be noted that each pair of the diagonally opposite joints at the outside corners of the magnetic core 40 in the layers 31 through 36 are similar in that each of the diagonally opposite joints is of the same type, that is, either along a line which runs from a corner of one of the windows to the nearest outside corner of the overall core or along a line which is parallel to said first line but displaced from it to provide an area of overlap. In general, the joints between the adjoining edges of the laminations in each of the layers 31 through 36 are overlapped by the laminations in the adjacent layers to provide combination butt and lap joints.

The amount of scrap resulting from the laminations included in the layers 31 through 36 being punched or cut from magnetic strip material is reduced to a minimum since said material is cut by and substantially perpendicular or preferably at an angle of 45° with respect to the longitudinal dimension or to the direction of orientation of said material. A small amount of scrap would result since certain of the yoke laminations and yoke lamination portions are cut partially at an oblique angle and partially at substantially a right angle with respect to said direction of orientation at one end of said laminations in order to provide the offset joints at the outside corners of each corner of a magnetic core as disclosed.

Figure 10:
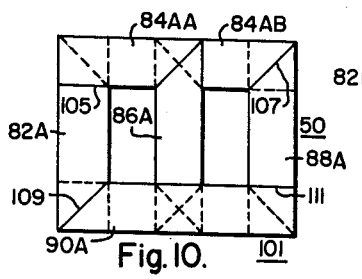
FIGS. 10, 11 and 12 show parts of a magnetic core structure illustrating a third embodiment of the invention.

Referring now to FIGURE 10, there is shown a magnetic core 50 illustrating a third embodiment of the invention. In general, the magnetic core 50 is similar to the magnetic core 40 except that the teachings of the invention have been extended to include the joints of the outside corners of the magnetic core 50. The magnetic core 50 includes one or more groups of at least three layers of laminations formed from a magnetic material having a preferred direction of orientation parallel to the longitudinal dimension of said material. Each of said layers includes at least three leg laminations and associated yoke laminations connecting the ends of said leg laminations to form a substantially rectangular core having two substantially rectangular windows.

In particular, the layers 101, 102 and 103 include the first and second outer leg laminations 82A and 88A, 82B and 88B, and 82C and 88C, respectively. The layers 101 and 102 also include first yoke laminations comprising first and second yoke lamination portions 84AA and 84AB and 84BA and 84BB, respectively, and the layer 103 includes the first yoke lamination 84C. The layers 102 and 103 include second yoke laminations each including first and second yoke lamination portions 90BA and 90BB and 90CA and 90CB, respectively, and the layer 101 includes the second yoke lamination 90A. One end of each of the laminations included in the layers 101 and 103, one end of each of the second yoke lamination portions 84BB and 90BB and both ends of the center leg lamination 86B of the layer 102 are cut at diagonally or at an oblique angle, preferably at an angle of substantially 45°, with respect to the direction of orientation of the strip material from which each of said laminations is formed. The other end of each of the latter laminations is cut at substantially a right angle or perpendicular to the direction of orientation of the strip material from which said laminations are formed. Both ends of the first and second outer leg laminations 82B and 88B and both ends of the first yoke lamination portions 84BA and 90BA of the layer 102 are cut substantially at a right angle with respect to the direction of orientation of the strip material from which said laminations are formed.

The joints between the adjoining edges of the center leg laminations of each of the layers 101 through 103 and the associated yoke laminations of said layers at each end of the core 50 are distributed into at least five different planes, two of said planes being parallel to each other and perpendicular to a third plane and the last two planes of said five planes being substantially perpendicular to each other and disposed at an oblique angle with respect to the first three planes, preferably at an angle of substantially 45°, as previously discussed in detail for a similar joint construction employed in the layers 31, 32 and 33, respectively, of the core 40.

Considering the joints between the adjoining edges of the outer leg laminations and the associated yoke laminations in each of the layers 101 and 103, two of the diagonally opposite joints between the adjoining edges of the outer leg laminations and the associated yoke laminations in each of said layers at the outside corners of the core 50 are disposed at an oblique angle, preferably at an angle of substantially 45°, with respect to the direction of orientation of the strip material from which said laminations are formed, as indicated at 107 and 109 for the layer 101 in FIG. 10. The joints between the adjoining edges of the outer leg laminations and the associated yoke laminations at the other two diagonally opposite outside corners of each of the layers 101 and 103 are disposed at substantially a right angle or perpendicular to the direction of orientation of the strip material from which one of the meeting laminations is formed. The latter joints in the layers 101 and 103 are disposed at substantially a right angle with respect to the direction of orientation of the strip material from which the outer leg laminations of each of said layers is formed, as indicated at 105 and 111 for the layer 101 shown in FIG. 10. The joints between the adjoining edges of the outer leg laminations and the associated yoke laminations of the layer 102 are disposed at substantially a right angle with respect to the direction of orientation of the strip material from which one of the meeting laminations is formed. The latter joints in this particular case are disposed at substantially a right angle with respect to the direction of orientation of the strip material from which the yoke laminations of the layer 102 is formed and are also substantially perpendicular to the perpendicular joints at the corresponding corners of each of the adjacent layers.

Considering the joint construction at each outside corner of the core 50, it is to be noted that, after the layers of one or more groups, each including at least three layers such as the layers 101 through 103, are assembled and stacked, that the joints between the adjoining edges of the outer leg laminations and the associated yoke laminations at each corner of the core 50 are divided or distributed in at least three different planes similarly to the joints magnetic core 30 shown in FIGS. 1 through 3. As explained in detail for the similar joints of magnetic core 30, the three planes, into which the joints at each outside corner of the magnetic core 50 are distributed or divided, include a first plane which is disposed substantially at a right angle with respect to the direction of orientation of the strip material from which the meeting yoke laminations of said corner are formed, a second plane which is substantially perpendicular to the direction of orientation of the strip material from which the meeting outer leg laminations of said corner are formed and which is also perpendicular to said first plane, and a third plane which is disposed at an oblique angle, preferably an angle of substantially 45°, with respect to the direction of orientation of the strip material from which the meeting yoke and outer leg laminations are formed.

In summary, the joints at each of the outside corners of the core 50 are divided or distributed into at least three planes and the joints between the center leg laminations and the associated yoke laminations at each end of this core 50 are divided or distributed into at least five planes in order that an area of overlap be provided by the laminations in adjacent layers for each joint between the laminations of each of the layers included in the core 50.

It is to be noted that laminations included in the magnetic core 50 readily lend themselves to a method of punching or cutting of said laminations from magnetic strip material which is essentially scrapless since the ends of the laminations included in the core 50 are cut either substantially perpendicular to the direction of orientation or to the longitudinal dimension of the strip material from which said laminations are formed or preferably at an angle of substantially 45° with respect to said direction of orientation.

Figure 11:
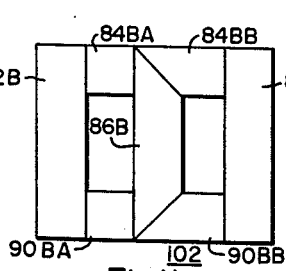
Figure 12:
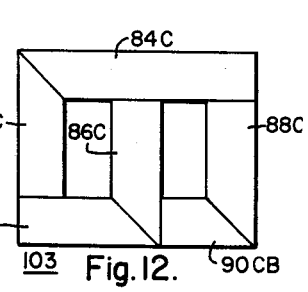
Figure 13:
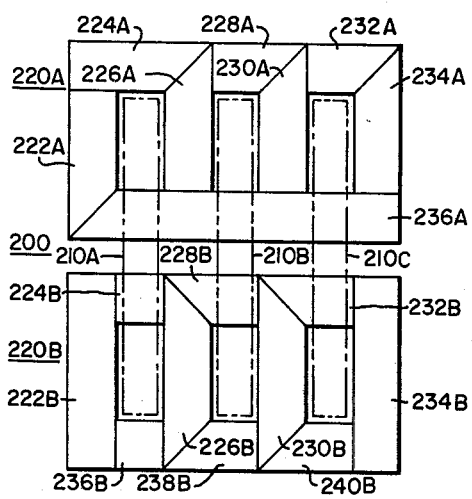
FIG. 13 is a top plan view of a core and coil assembly, with the windings shown in phantom, illustrating a modified form of the magnetic core structure whose parts are shown in FIGS. 10 through 12.

Referring to FIG. 13, the core construction illustrated in the magnetic core 50 shown in FIGS. 10 through 12 can be modified for applications which require a three phase core of the shell form type as shown in FIG. 13 by adding an additional intermediate lamination. The core and coil assembly shown in FIG. 13 includes a magnetic core structure 200 on which is inductively disposed three phase windings 210A, 210B and 210C. The magnetic core structure 200 includes first and second magnetic core sections 220A and 220B, each of said magnetic core sections comprising one or more groups of layers of laminations formed from a magnetic strip material having a preferred direction of orientation lengthwise of said material, each of said groups including at least three layers of laminations. Each of the magnetic core sections 220A and 220B are similar to the magnetic core 50 except that an additional intermediate lamination has been added to each layer of laminations in order to provide a magnetic core having a shell form construction.

The first magnetic core section 220A is substantially identical with the second magnetic core section 220B and only said first magnetic core section will be described in detail. Each of the layers of laminations included in the magnetic core section 220A includes at least four yoke laminations and associated leg laminations connecting the end of said leg laminations to form a substantially rectangular core section having three substantially rectangular windows. In particular, the top layer of laminations of the magnetic core section 220A includes first and second outer yoke laminations 220A and 234A, respectively, first and second intermediate yoke laminations 226A and 230A, respectively, a center leg lamination 236A and an outer leg lamination comprising first, second and third outer leg laminations 224A, 228A and 232A, respectively. Similarly, the top layer of the magnetic core section 220B includes first and second outer yoke laminations 230B and 234B, respectively, first and second intermediate yoke laminations 226B and 230B, a center leg lamination comprising first, second and third center leg lamination portions 224B, 228B and 232B and an outer leg lamination comprising first, second and third outer leg lamination portions 236B, 238B and 240B, respectively. The latter two layers of laminations just described correspond to the layers 101 and 102 and the magnetic core 50 shown in FIGS. 10 and 11, respectively, except that an additional intermediate lamination has been added to said layers of the magnetic core sections 220A and 220B which is similar to the center leg laminations of the layers 101 and 102, respectively. The magnetic core sections 220A and 220B also differ from the magnetic core 50 in that the yoke and leg laminations of said cores are effectively interchanged since the magnetic core sections 220A and 220B are employed in a shell form type construction. It is to be noted that the center leg laminations of the magnetic core sections 220A and 220B are disposed side by side to provide an effective overall leg member having a width which is substantially twice the width of the outer leg members of the overall core 200, as required for shell form construction.

As previously mentioned, each of the magnetic core sections 220A and 220B includes one or more groups of at least three layers of laminations which are similar to the layers of laminations 101, 102 and 103 of the magnetic core 50 except that each layer of laminations includes an additional intermediate lamination which is similar to the center leg lamination of each of the layers 101, 102 and 103, respectively. The joints, therefore, between the meeting laminations at the outside corners of the magnetic core sections 220A and 220B are substantially identical to the corresponding joints of the laminations at the outside corners of the magnetic core 50. The joints between the intermediate yoke laminations and the associated leg laminations at each end of the first and second magnetic core sections 220A and 220B, respectively, are also substantially identical to the joint construction between the center leg laminations and the yoke laminations at each end of the magnetic core 50 as previously described in detail for the core 50. Similarly to the magnetic core 50, the laminations of the magnetic core 200 lend themselves to a method of punching or cutting from magnetic strip material which is essentially scrapless since the ends of the laminations included in the layers of both of said cores are of the same form.

Figure 14:
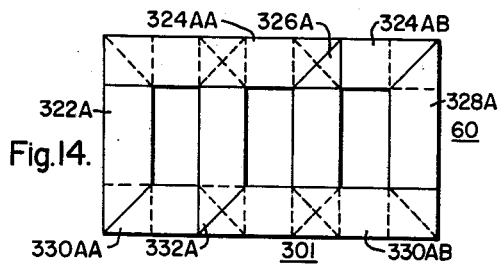
FIGS. 14, 15 and 16 show parts of a magnetic core structure illustrating a fourth embodiment of the invention.

Referring to FIG. 14, there is shown a magnetic core structure illustrating a fourth embodiment of the invention. The magnetic core 60 shown in FIG. 14 is similar to magnetic core sections 220A and 220B of the magnetic core 200, shown in FIG. 13, and could be substituted for either of said magnetic core sections in a three-phase magnetic core of the shell form type similar to that shown in FIG. 13. The magnetic core 60, therefore, represents one of the two magnetic core sections required for a complete three-phase magnetic core of the shell form type, each of the sections being identical to the magnetic core 60. The magnetic core 60 includes one or more groups of stacked layers of laminations formed from magnetic strip material having a preferred direction of orientation lengthwise of said material, each of said groups including at least three layers of laminations. Each of said layers includes at least four yoke laminations and associated leg laminations connecting the ends of said yoke laminations to form a substantially rectangular magnetic core or magnetic core section having three substantially rectangular windows.

Figure 15:
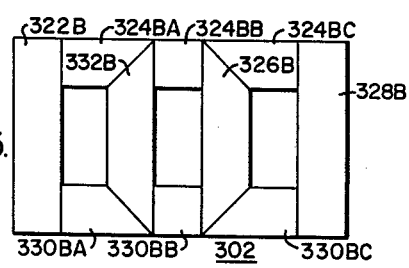
Figure 16:
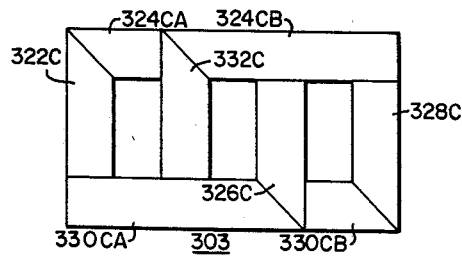

In particular, the magnetic core 60 includes one or more groups of layers of laminations, each of said groups including at least three layers such as the layers 301, 302 and 303 as illustrated in FIGS. 14, 15 and 16, respectively. The layers 301 and 303 include first and second outer yoke laminations 322A and 328A and 322C and 328C, respectively, first and second intermediate yoke laminations 322A and 326A, and 332C and 326C, respectively, an outer leg lamination comprising first and second outer leg lamination portions 324AA and 324AB, and 324CA and 324CB, respectively, and center leg laminations comprising first and second center leg lamination portions 330AA and 330AB, and 330CA and 330CB, respectively.

Referring to FIG. 15, the layer 302 includes first and second outer yoke laminations 332B and 328B, respectively, first and second intermediate yoke laminations 332B and 326B, respectively, an outer leg lamination comprising first, second and third outer leg lamination portions 324BA, 324BB and 324BC, respectively, and a center leg lamination comprising first, second and third center leg lamination portions 330BA, 330BB and 330BC, respectively. One end of each of the laminations included in the layers 301 and 303, one end of each of the first and third outer leg and center leg lamination portions and both ends of the intermediate yoke laminations of the layer 302 are cut at an oblique angle, preferably an angle of 45° with respect to the direction of orientation of the strip material from which said laminations are formed. The other end of each of the latter laminations is cut substantially perpendicular to the direction of orientation of the strip material from which each of the latter laminations are formed. Both ends of the first and second outer yoke laminations 322B and 328B, respectively, and both ends of the second outer leg and center leg lamination portions 324BB and 330BB, respectively, of the layer 302 are cut at substantially a right angle with respect to the orientation of the strip material from which said laminations are formed.

The joints between the outer yoke laminations and the associated leg laminations included in each of the layers 301 through 303 at each corner of the magnetic core 60 are divided into three planes similarly to the joints at the outside corners of the magnetic core 50. As described in greater detail in connection with the magnetic core 50, the joints at the outside corners of the magnetic core 60 are divided or distributed into at least three planes including first and second planes which are substantially perpendicular to each other and substantially perpendicular to the direction of orientation of the strip material from which either the meeting yoke lamination or the meeting leg lamination at each corner of the core 60 is formed and a third plane which is disposed at an oblique angle, preferably an angle of substantially 45°, with respect to the direction of orientation of the strip material from which both the meeting yoke and leg lamination at each corner of the magnetic core 60 is formed.

Figure 19:
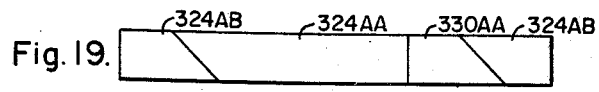
FIGURES 19 and 20 are diagrammatic views illustrating the method of punching or cutting the laminations included in the parts of the magnetic core structure shown in FIGS. 14 through 18 from magnetic strip material.

The joints between the intermediate yoke laminations and the associated leg laminations at each end of the core 60 in the layers 301 through 303 are also similar to the corresponding joints between the laminations of the magnetic core 50 and the magnetic core sections of the magnetic core 200. As described in greater detail for the latter cores, the joints between the intermediate yoke laminations and the associated leg laminations of the layers included of the magnetic core 60 are divided into at least five planes as shown in FIG. 14. Two of said five planes are substantially perpendicular to the direction or orientation of the strip material from which the leg laminations of the core 60 are formed and parallel to and disposed from each other by substantially the width of the intermediate yoke laminations included in the core 60. A third plane of said five planes, as shown in FIG. 14 is substantially perpendicular to the direction of orientation of the magnetic strip material from which the intermediate yoke laminations are formed and also substantially perpendicular to said first two planes. The last two planes of said five planes into which the joints between the intermediate yoke laminations and the associated leg laminations of the core 60 are divided or distributed, are substantially perpendicular to each other and disposed at an oblique angle, preferably an angle of substantially 45°, with respect to direction of orientation of the strip material from which the meeting intermediate yoke and leg laminations are formed. The latter two planes are preferably disposed at an oblique angle of substantially 45° with respect to the first three planes just mentioned. Similarly to the cores 50 and 200, the joints between the laminations in each of the layers of the core 60 are overlapped by the laminations in the adjacent layers to provide combination butt and lap joints. Similarly, also to the core 50, the laminations of the core 60 readily lend themselves to an essentially scrapless method of punching or cutting from magnetic strip material. A scrapless method of punching the leg laminations 324AA, 324AB, 322A and 332A of the layer 301 is illustrated in FIG. 19.

Figure 17:
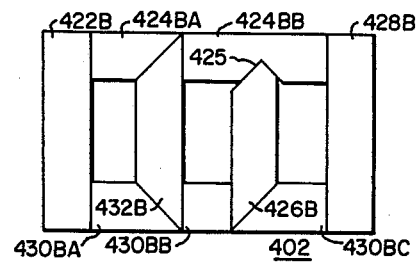
FIGS. 17 and 18 illustrate alternative constructions for the part of the magnetic core structure shown in FIG. 15.

Referring to FIG. 17, there is illustrated an alternative layer of laminations 402 which may be substituted for the layer 302 in the magnetic core 60. In general, the layer 402 is similar to the layer 302 except that the second intermediate yoke lamination 426B and the associated leg lamination 424BB are substituted for the second intermediate yoke lamination 326B and the associated leg lamination portions 324BB and 324BC of the layer 302 in order to reduce the number of leg lamination portions which must be handled during the assembly and stacking of the particular layer under consideration.

In particular, the layer 402 includes first and second yoke laminations 422B and 428B, respectively, a first intermediate yoke lamination 432B, an outer leg lamination portion 424BA and a center leg lamination comprising first, second and third center leg lamination portions 430BA, 430BB and 430BC which are all identical to the corresponding lamination of the layer 302. The second intermediate yoke lamination 426B is substituted for the second intermediate yoke lamination 326B of the layer 302 and the second outer leg lamination portion 424B is substituted for the second and third outer leg lamination portions 324BB and 324BC of the layer 302. The latter substitution reduces the number of leg lamination pieces which must be handled during the assembly and stacking of the magnetic core 60 when modified to include the layer 402.

The joints between the laminations of the layer 402 are all identical to the joints between the corresponding laminations of the layer 302 except for the joint between the second intermediate yoke lamination and the associated outer leg lamination or outer leg lamination portions. Both ends of the second outer leg lamination portion 424B are cut substantially perpendicular to the direction of the strip material from which said lamination portion is formed. The upper end of the second intermediate yoke lamination 426B is cut to be generally V-shaped, the two sides of the upper end and the yoke lamination 426B being cut at an oblique angle, preferably an angle of substantially 45° with respect to the direction of orientation, are strip material from which said lamination is formed, with said sides being disposed at substantially a right angle with respect to each other instead of being merely cut entirely at an oblique angle as is the corresponding yoke lamination 326B of the layer 302. The outer leg lamination portion 424BB includes a generally V-shaped matching recess to accommodate the upper end of the yoke lamination 426B, the sides of said recess are also cut diagonally with respect to the direction of orientation of the strip material from which said outer leg lamination portion is formed, preferably at an angle of substantially 45°, and are also substantially perpendicular to each other. In order to provide an area of overlap for the joint between the adjoining edges of one side of the upper end of the yoke lamination 426B and the outer leg lamination portion 424BB, as indicated at 425, said joint is shifted or offset and parallel to the joint between the adjoining edges of the second intermediate yoke lamination 326A and the first outer leg lamination portion 324AA in the layer 301. It is to be understood that the layer 402 could be further modified to include first and second intermediate yoke laminations also modified at one or both ends to provide joints with associated modified leg laminations similar to the joint construction shown in FIG. 17 between the adjoining edges of the upper end of the second intermediate yoke lamination 426B and the outer leg lamination portion 424BB. A magnetic core including the layer 402 instead of the layer 302 would still provide combination butt and lap joints similar to those previously discussed in greater detail for the magnetic core 60.

Figure 18:
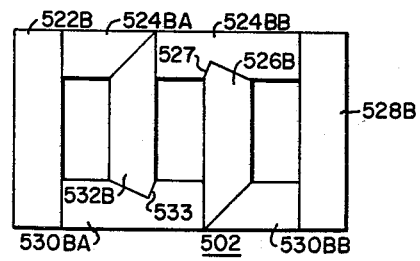

Referring to FIG. 18, there is shown a second alternative layer of laminations 502 which may also be substituted for the layer 302 in the magnetic core 60. The layer 502 has advantages similar to the layer 402 over the layer 302 of less leg laminations or leg lamination portions which must be handled during the assembly and stacking of a magnetic core including the layer 502 rather than the layer 302. The layer 502 is similar to the layer 302 except that the first and second intermediate yoke laminations 532B and 526B are substituted for the first and second intermediate yoke laminations 332B and 336B, respectively, of the layer 302 with corresponding changes in the associated leg laminations.

In particular, the layer 502 includes first and second outer yoke laminations 522B and 528B, respectively, a first outer leg lamination portion 524BA and a second center leg lamination portion 530BB which are all identical to the corresponding laminations in the layer 302. The second outer leg lamination portion 524BB is substituted for the second and third outer leg lamination portions 324BB and 324BC, respectively, of the layer 302 and the first center leg lamination portion 530BA is substituted for the first and second center leg lamination portions 330BA and 330BB, respectively, of the layer 302. The upper end of the first intermediate yoke lamination 532B and the lower end of the second intermediate yoke lamination 526B are identical with the corresponding ends of the first and second intermediate yoke laminations 332B and 326B of the layer 302. The other ends of the intermediate yoke laminations 532B and 526B are modified to be generally V-shaped similarly to the upper end of the second intermediate yoke lamination 426B of the layer 402. The lower end of the first intermediate yoke lamination 532B and the upper end of the second intermediate yoke lamination 526B each includes two sides which are cut at an oblique angle with respect ot the direction of orientation of the strip material from which said laminations are formed, the two sides of each of said ends being substantially perpendicular to each other. The second outer leg lamination portion 524BB and the first center leg lamination portion 530BA are each cut at both ends to be substantially perpendicular to the direction of orientation of the strip material from which said lamination portions are formed and each of said leg lamination portions includes a generally V-shaped matching recess to accommodate the V-shaped cut ends of the associated second intermediate yoke lamination 526B and the first intermediate yoke lamination 532B, respectively, similarly to the second outer leg lamination portion 424BB of the layer 402 shown in FIG. 17.

In order to provide an area of overlap between the joints between the adjoining edges of the smaller side of each of the V-shaped ends of the intermediate yoke laminations 532B and 526B and the associated leg lamination portions 530BA and 524BB, respectively, as indicated at 533 and 527, respectively, and the joints between the adjoining edges between the corresponding intermediate yoke laminations and the associated leg laminations in the layer 301, the former joints are disposed at a different oblique angle with respect to the direction of orientation of the strip material from which said meeting laminations are formed than are the joints between the corresponding intermediate yoke laminations and the associated leg laminations in the adjacent layer 301 of a magnetic core including the layer 502. In particular, the joints indicated at 533 and 527 are preferably disposed at an acute angle of substantially 22½° with respect to the adjacent vertical side as extended of the meeting intermediate yoke laminations 532B and 526B, respectively, instead of being disposed at an oblique angle of preferably 45°, as are the joints between the adjoining edges of the corresponding laminations in the adjacent layer 301 as shown in FIG. 14. In other words, the joints as indicated at 533 and 527 are not parallel to the adjacent joints between the corresponding laminations in the adjacent layer 301 but are overlapping being disposed at an intersecting angle of substantially 22½° with respect to each of the adjacent joints. The joint construction just described between the V-shaped end of the intermediate yoke laminations and the associated leg laminations of the layer 502, therefore, provides with the corresponding joints in the adjacent layers 301 and 303 combination butt and lap joints similar to those provided in a core including the layer 402 rather than the layer 302. The layer 502 has the advantage over the layer 402 that cut out portions are not present adjacent to the V-shaped ends of the intermediate yoke laminations as shown in FIG. 17 which thereby reduces the flux density in the adjacent joints of the former layer.

Figure 20:
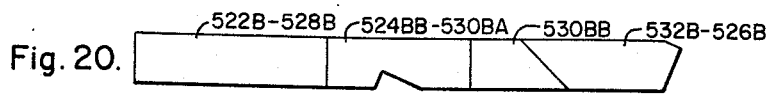

Referring to FIG. 20, a method of punching the laminations of the layer 502 is illustrated. A small amount of scrap results as shown in FIG. 20 because of the V-shaped recess in the leg laminations 524BB and 530BA and because of the V-shaped ends of the intermediate yoke laminations 532B and 526B.

It is important to note that the layer 502 has the important advantage over the layer 302 that only two leg lamination portions would have to be handled at each end of the layer 502 compared to three leg lamination portions at each end of the layer 302. The second leg lamination portions at each end of the layer 302 are particularly a problem during the assembly of a shell form magnetic core about preformed associated electrical windings which would be inductively disposed on said core similarly to the core and coil assembly shown in FIG. 13.

In summary, it has been found that a core construction as disclosed by the applicant in which the joints between the adjoining edges of the meeting laminations are distributed into three or more planes requires a lower exciting current and lower losses are associated with a magnetic core embodying the teachings of the invention. This is because the flux density in each overall joint in a magnetic core as disclosed is reduced since the amount of effective magnetic material in any particular plane of each overall joint of a core as disclosed is increased over that provided in a core construction such as that disclosed in the Putman patents.

It is to be understood that in a magnetic core embodying the teachings of the invention that more than one layer having identical laminations may be stacked at the same time in order to facilitate assembly in stacking an overall magnetic core. It is anticipated that the maximum number of identical layers which could be conveniently stacked simultaneously would be three layers. In other words, a magnetic core of the latter type would include one or more groups and each group would have two or three times the number of layers as in the groups of the various cores as disclosed but the joints between the laminations of the respective layers of the groups of such a core would still be divided or distributed in the same number of planes in each overall joint or in the same ratio or proportion as for the various cores disclosed.

In the various magnetic cores disclosed, the invention was illustrated with the yoke laminations having substantially the same width as the associated leg laminations in each layer. It is to be understood that the width of the yoke laminations in certain core applications may be greater than the width of the leg laminations. The joints between the yoke laminations and the associated leg laminations in each layer of such a core would merely be extended with the ends of certain laminations modified to maintain a substantially rectangular shape of the overall core embodying such a modified construction.

It may also be desirable in certain applications to invert the layers of certain laminations in alternate groups where more than one group of layers is included in a particular core as disclosed. For example, the layer 402 shown in FIG. 17 could be inverted or reversed in alternate groups of layers of a magnetic core similar to the magnetic core 60 shown in FIG. 14. It is obvious also that the layers of laminations included in the various groups of layers of the different cores as disclosed could be stacked in a recurring pattern or sequence or the order may be modified in certain groups for certain applications.

As mentioned previously, the magnetic material contemplated in practicing the teachings of this invention is a magnetic strip material having at least one direction of orientation substantially parallel to the longitudinal dimension of said material or to the sides of said material, such as cold rolled silicon steel. It is to be understood that the magnetic strip material employed in providing cores as disclosed may also have two preferred directions of orientation, a first direction being parallel to the longitudinal dimension of said strip material and the second direction of orientation being substantially perpendicular to the longitudinal dimension or the sides of said strip material. Examples of a magnetic strip material having two preferred directions of orientation include certain silicon-iron alloys, nickel-iron alloys and aluminum-iron alloys known to those skilled in the art, such as that which is described in copending application Serial No. 601,482, filed by Pavlovich et al. and assigned to the assignee of the present application.

A magnetic core structure embodying the teachings of this invention has several advantages. First, the exciting current and associated losses of a magnetic core as disclosed are lower than those of a conventional magnetic core of the same general type. Second, the laminations of a magnetic core structure as disclosed readily lend themselves to methods of punching or cutting from magnetic strip material which are essentially scrapless or which result in a reduced amount of scrap compared to that resulting from the punching of laminations in conventional magnetic cores, particularly those of three-phase type. Third, the laminations of a magnetic core as disclosed lend themselves to convenient assembly and stacking during manufacture. The advantages are of particular importance in providing magnetic core structures in which the magnetic material, from which the laminations of the core are made or formed, is employed or worked at higher flux densities.

Since numerous changes may be made in the above described apparatus and different embodiments of the invention may be made without departing from the spirit and scope thereof, it is intended that all the matter contained in the foregoing description or shown in the accompanying drawings shall be interpreted as not illustrative and not in a limiting sense.

I claim as my invention:

1. In a magnetic core structure, the combination comprising, a plurality of stacked layers of laminations formed from magnetic strip material having a preferred direction of orientation substantially parallel to the sides of said strip material, each of said layers including at least one intermediate and two outer leg laminations and yoke laminations connecting the ends of said leg laminations to form a substantially rectangular core having at least two substantially rectangular windows, said plurality of layers being divided into groups each including at least three layers, the joints between the adjoining edges of the laminations in two of the layers of each group being diagonal with respect to the sides of said strip material at two diagonally opposite corners of said core structure and substantially perpendicular with respect to the direction of orientation of the strip material from which one of the meeting laminations is formed at the other two diagonally opposite corners of each of said two layers, the joints between the adjoining edges of the laminations of the third layer of each group at each of the corresponding corners of said core structure being substantially perpendicular with respect to the perpendicular joints of the other two layers in said group, the joints between the adjoining edges of said intermediate leg and yoke laminations in the layers of each group being divided into two planes which are disposed at an angle of substantially 45° with respect to the direction of orientation of the strip material of said leg laminations and perpendicular to each other, two planes which are displaced from and parallel to each other and to the latter direction of orientation, and one plane which is perpendicular to the latter direction of orientation, the joints between the adjoining edges of the laminations in each of said layers being overlapped by the laminations in the adjacent layers.

2. In a magnetic core structure, the combination comprising, a plurality of stacked layers of laminations formed from magnetic strip material having a preferred direction of orientation substantially parallel to the sides of said strip material, each of said layers including at least one intermediate and two outer leg laminations and yoke laminations connecting the ends of said leg laminations to form a substantially rectangular core having at least two substantially rectangular windows, said plurality of layers being divided into groups each including at least three layers, the joints between the adjoining edges of the laminations in two of the layers of each group being diagonal with respect to the sides of said strip material at two diagonally opposite corners of said core structure and substantially perpendicular with respect to the direction of orientation of the strip material from which one of the meeting laminations is formed at the other two diagonally opposite corners of each of said layers, the joints between the adjoining edges of the laminations of the third layer of each group at each of the corresponding corners of said core structure being substantially perpendicular with respect to the perpendicular joints of the other two layers in said group, the joints between the adjoining edges of said intermediate leg and yoke laminations in the layers of each group being divided into two planes which are disposed at an angle of substantially 45° with respect to the direction of orientation of the strip material of said leg laminations and perpendicular to each other, two planes which are displaced from and parallel to each other and to the latter direction of orientation, and one plane which is perpendicular to the latter direction of orientation, the joints between the adjoining edges of the laminations in each of said layers being overlapped by the laminations in the adjacent layers, the layers of each of said groups being stacked in a recurring order.

3. In an electrical apparatus, a three-phase magnetic core structure of the shell form type comprising first and second magnetic core sections disposed side by side with one another to form a substantially rectangular magnetic core, each of said sections including a plurality of layers of laminations formed from magnetic strip material having a first preferred direction of orientation lengthwise of said material and a second preferred direction of orientation substantially perpendicular to the longitudinal dimension of said strip material, each layer including two outer and two intermediate yoke laminations and leg laminations connecting the ends of said yoke laminations together to form three substantially rectangular windows, said plurality of layers being divided into groups each including at least three layers, the joints between the adjoining edges of the laminations in two of the layers of each group being diagonal with respect to the longitudinal dimension of said strip material at two diagonally opposite corners of each of said core sections and substantially perpendicular with respect to the first direction of orientation of the strip material from which one of the meeting laminations is formed at the other two diagonally opposite corners of each of said layers, the joints between the adjoining edges of the laminations of the third layer of each group at each of the corresponding corners of each core section being substantially perpendicular with respect to the perpendicular joints in the other layers of each group, the joints between the adjoining edges of the laminations in each of said layers of each group being overlapped by the laminations in the adjacent layers.

4. In an electrical apparatus, a three-phase magnetic core structure of the shell form type comprising first and second magnetic core sections disposed side by side with one another to form a substantially rectangular magnetic core, each of said sections including a plurality of layers of laminations formed from magnetic strip material having a first preferred direction of orientation lengthwise of said material and a second preferred direction of orientation substantially perpendicular to the longitudinal dimension of said strip material, each layers including two outer and two intermediate yoke laminations and leg laminations connecting the ends of said yoke laminations together to form three substantially rectangular windows, said plurality of layers being divided into groups each including at least three layers, the joints between the adjoining edges of the laminations in two of the layers of each group being diagonal with respect to the longitudinal dimension of said strip material at two diagonally opposite corners of each of said core sections and substantially perpendicular with respect to the first direction of orientation of the strip material from which one of the meeting laminations is formed at the other two diagonally opposite corners of each of said layers, the joints between the adjoining edges of the laminations of the third layer of each group at each of the corresponding corners of each core section being substantially perpendicular with respect to the perpendicular joints in the other layers of each group, the joints between the adjoining edges of the laminations in each of said layers in each group being overlapped by the laminations in the adjacent layers, the layers of each of said groups being stacked in a repeated sequence.

5. In an electrical apparatus, a three-phase magnetic core structure of the shell form type comprising a plurality of layers of laminations formed from magnetic strip material having a first preferred direction of orientation substantially parallel to the sides of said strip material and a second preferred direction of orientation substantially perpendicular to the longitudinal dimension of said strip material, each of said layers including four outer and four intermediate yoke laminations and outer and center leg laminations connecting the ends of said yoke laminations together to form six substantially rectangular windows, said center leg laminations of each layer being disposed in side by side relation to provide a leg member having a width substantially twice the width of the outer leg laminations, said plurality of layers being divided into groups each including at least three layers, the joints between the adjoining edges of the laminations in two of the layers in each group at each corner of said core structure being substantially perpendicular with respect to the first direction of orientation of the strip material from which one of the meeting laminations is formed and substantially perpendicular to one another, the joints between the adjoining edges of the laminations in the third layer of each group at each of said corners being diagonal with respect to the sides of said strip material, the joints between the adjoining edges of the laminations in each of said layers of each group being overlapped by the laminations in each of the adjacent layers.

6. In an electrical apparatus, a three-phase magnetic core structure of the shell form type comprising a plurality of layers of laminations formed from magnetic strip material having a first preferred direction of orientation substantially parallel to the sides of said strip material and a second preferred direction of orientation substantially perpendicular to the longitudinal dimension of said strip material, each of said layers including four outer and four intermediate yoke laminations and outer and center leg laminations connecting the ends of said yoke laminations together to form six substantially rectangular windows, said center leg laminations of each layer being disposed in side by side relation to provide a leg member having a width substantially twice the width of the outer leg laminations, said plurality of layers being divided into groups each including at least three layers, the joints between the adjoining edges of the laminations in two of the layers in each group at each corner of said core structure being substantially perpendicular with respect to the first direction of orientation and substantially parallel with respect to the second direction of orientation of the strip material from which one of the meeting laminations is formed and substantially perpendicular to one another, the joints between the adjoining edges of the laminations in the third layer of each group at each of said corners, being diagonal with respect to the sides of said strip material, the joints between the adjoining edges of the laminations in each of said layers of each group being overlapped by the laminations in each of the adjacent layers, the layers of each group being stacked in a repeated sequence.

7. In an electrical apparatus, a magnetic core structure comprising, a plurality of stacked layers of laminations formed from magnetic strip material having a first preferred direction of orientation substantially parallel to the sides of said strip material and a second preferred direction of orientation substantially perpendicular to the longitudinal dimension of said strip material, each of said layers including first and second outer leg laminations and a center leg lamination and yoke laminations connecting the ends of said leg laminations to form a substantially rectangular core having two substantially rectangular windows, said plurality of layers being divided into one or more groups each including at least three layers, the joints between the adjoining edges of said outer leg laminations and said yoke laminations being at an oblique angle with respect to the sides of said strip material and being offset from and parallel to each other in alternate layers and to the joints in corresponding layers in alternate groups at each corner of said core to provide overlap between the joints in alternate layers at each corner of said core, the joints between the adjoining edges of the center leg laminations and the associated yoke lamination portions at each end of said core being substantially perpendicular and diagonal, respectively, with respect to the first direction of orientation of the strip material of the associated yoke lamination portions in two of the three layers of each group, the joint between the adjoining edges of said center leg lamination and the associated yoke lamination at each end of said core in the third layer of said group being substantially perpendicular to the first direction of orientation of the strip material of said center leg lamination, the joints between the adjoining edges of the laminations in each of the stacked layers of each group being overlapped by the laminations in the adjacent layers.

8. In an electrical apparatus, a magnetic core structure comprising, a plurality of stacked layers of laminations formed from magnetic strip material having a first preferred direction of orientation substantially parallel to the sides of said strip material and a second preferred direction of orientation substantially perpendicular to the longitudinal dimension of said strip material, each of said layers including first and second outer leg laminations and a center leg lamination and yoke laminations connecting the ends of said leg laminations to form a substantially rectangular core having two substantially rectangular windows, said plurality of layers being divided into one or more groups each including at least three layers, the joints between the adjoining edges of said outer leg laminations and said yoke laminations being at an oblique angle with respect to the sides of said strip material and being offset from and parallel to each other in alternate layers and to the joints in corresponding layers in alternate groups at each corner of said core to provide overlap between the joints in alternate layers, the joints between the adjoining edges of the center leg laminations and the associated yoke laminations at each end of said core being substantially perpendicular and diagonal, respectively, with respect to the first direction of orientation of the strip material of the associated yoke laminations in two of the three layers of each group, the joint between the adjoining edges of said center leg lamination and the associated yoke lamination at each end of said core in the third layer of said group being substantially perpendicular to the first direction of orientation of the strip material of said center leg lamination, the joints between the adjoining edges of the laminations in each of the stacked layers of each group being overlapped by the laminations in the adjacent layers, the layers of each group being stacked in a recurring sequence.

9. In an electrical apparatus, a magnetic core structure comprising, a plurality of stacked layers of laminations formed from magnetic strip material having a first preferred direction of orientation substantially parallel to the sides of said strip material and a second preferred direction of orientation substantially perpendicular to the longitudinal dimension of said strip material, each of said layers including first and second outer leg laminations and a center leg lamination and yoke laminations connecting the ends of said leg laminations to form a substantially rectangular core having two substantially rectangular windows, said plurality of layers being divided into one or more groups each including at least three layers, the joints between the adjoining edges of said outer leg laminations and said yoke laminations being at an oblique angle with respect to the sides of said strip material and being offset from and parallel to each other in alternate layers and to the joints in corresponding layers in alternate groups at each corner of said core to provide an overlap between the joints in alternate layers, the joints between the adjoining edges of the center leg laminations and the associated yoke laminations at each end of said core being substantially perpendicular and diagonal, respectively, with respect to the first direction of orientation of the strip material of the associated yoke laminations in two of the three layers of each group, the joint between the adjoining edges of said center leg lamination and the associated yoke lamination at each end of said core in the third layer of each group being substantially perpendicular to the first direction of orientation of the strip material of said center leg lamination, the joints between the adjoining edges of the laminations in each of the stacked layers of each group being overlapped by the laminations in the adjacent layers, the layers of each group being stacked in a recurring sequence with the layers of alternate groups being inverted with respect to the layers of the other groups during stacking.

10. In an electrical apparatus, a magnetic core structure comprising a plurality of stacked layers of laminations formed from magnetic strip material having a first preferred direction of orientation lengthwise of said strip material and a second preferred direction of orientation substantially perpendicular to the longitudinal dimension of said strip material, each of said layers including two outer and one center leg lamination and yoke laminations connecting the ends of said leg laminations to form a substantially rectangular core having two substantially rectangular windows, said plurality of layers being divided into one or more groups each including at least three layers, the joints between the adjoining edges of said outer leg laminations and said yoke laminations being diagonally disposed with respect to the longitudinal dimension of said strip material and being offset from and parallel to each other in alternate layers and to the joints in corresponding layers in alternate groups at each corner of said core to provide an overlap between said joints in alternate layers, the joints between the adjoining edges of said center leg laminations and the associated yoke laminations at each end of said core in two of the layers of each group being disposed in two displaced parallel planes substantially perpendicular to the first direction of orientation of the strip material of said yoke laminations and in two substantially perpendicular planes which are each disposed at an oblique angle with respect to said first direction of orientation, the joint between the adjoining edges of said center leg lamination and said yoke lamination in the third layer of each group at each end of said core being substantially parallel to the first direction of orientation of the strip material of said yoke laminations, the joints between the adjoining edges of said laminations in each of said layers in each group being overlapped by the laminations in the adjacent layers.

11. In an electrical apparatus, a magnetic core structure comprising a plurality of stacked layers of laminations formed from magnetic strip material having a first preferred direction of orientation lengthwise of said strip material and a second preferred direction of orientation substantially perpendicular to the longitudinal dimension of said strip material, each of said layers including two outer and one center leg lamination and yoke laminations connecting the ends of said leg laminations to form a substantially rectangular core having two substantially rectangular windows, said plurality of layers being divided into one or more groups each including at least three layers, the joints between the adjoining edges of said outer leg laminations and said yoke laminations being diagonally disposed with respect to the longitudinal dimension of said strip material and being offset from and parallel to each other in alternate layers and to the joints in corresponding layers in alternate groups at each corner of said core to provide an overlap between said joints in alternate layers, the joints between the adjoining edges of said center leg laminations and the associated yoke lamination portions at each end of said core in two of the layers of each group being disposed in two displaced parallel planes substantially perpendicular to the first direction of orientation and substantially parallel to the second direction of orientation of the strip material of said yoke laminations and in two substantially perpendicular planes which are each disposed at an oblique angle with respect to said direction of orientation, the joint between the adjoining edges of said center leg lamination and said yoke lamination in the third layer of each group at each end of said core being substantially parallel to the first direction of orientation of the strip material of said yoke laminations, the joints between the adjoining edges of said laminations in each of said layers being overlapped by the laminations in the adjacent layers, the layers of each group being stacked in a recurring sequence.

12. In an electrical apparatus, a magnetic core structure comprising a plurality of stacked layers of laminations formed from magnetic strip material having a first preferred direction of orientation lengthwise of said strip material and a second preferred direction of orientation substantially perpendicular to the longitudinal dimension of said strip material, each of said layers including two outer and one center leg lamination and yoke laminations connecting the ends of said leg laminations to form a substantially rectangular core having two substantially rectangular windows, said plurality of layers being divided into one or more groups each including at least three layers, the joints between the adjoining edges of said outer leg laminations and said yoke laminations being diagonally disposed with respect to the longitudinal dimension of said strip material and being offset from and parallel to each other in alternate layers and to the joints in corresponding layers in alternate groups at each corner of said core to provide an overlap between said joints in alternate layers, the joints between the adjoining edges of said center leg laminations and the associated yoke laminations at each end of said core in two of the layers of each group being disposed in two displaced parallel planes substantially perpendicular to the first direction of orientation of the strip material of said yoke laminations and in two substantially perpendicular planes which are disposed at an oblique angle with respect to said first direction of orientation, the joint between the adjoining edges of said center leg lamination and said yoke lamination in the third layer of each group at each end of said core being substantially parallel to the first direction of orientation of the strip material of said yoke laminations, the joints between the adjoining edges of said laminations in each of said layers in each group being overlapped by the laminations in the adjacent layers, the layers of each group being stacked in a recurring sequence with the layers of alternate groups being inverted with respect to the layers of the other groups during stacking.

13. In an electrical apparatus, a three-phase magnetic core structure of the shell form type comprising a plurality of layers of laminations formed from magnetic strip material having a preferred direction of orientation substantially parallel to the sides of said strip material, each of said layers including four outer and four intermediate yoke laminations and outer and center leg laminations connecting the ends of said yoke laminations together to form six substantially rectangular windows, said center leg laminations of each layer being disposed in side by side relation to provide a leg member having a width substantially twice the width of the outer leg laminations, said plurality of layers being divided into groups each including at least three layers, the joints between the adjoining edges of the laminations in two of the layers in each group at each corner of said core structure being substantially perpendicular with respect to the direction of orientation of the strip material from which one of the meeting laminations is formed and substantially perpendicular to one another, the joints between the adjoining edges of the laminations in the third layer of each group at each of said corners being diagonal with respect to the sides of said strip material, the joints between the corresponding adjoining edges of the intermediate yoke laminations and the associated leg laminations in the layers of each group being generally V-shaped in two of said layers and displaced from one another and substantially perpendicular to the direction of orientation of the strip material of said yoke laminations in the third layer of said group, the joints between the adjoining edges of the laminations in each of said layers of each group being overlapped by the laminations in each of the adjacent layers.

14. In an electrical apparatus, a three-phase magnetic core structure of the shell form type comprising a plurality of layers of laminations formed from magnetic strip material having a first preferred direction of orientation substantially parallel to the sides of said strip material and a second preferred direction of orientation substantially perpendicular to the longitudinal dimension of said strip material, each of said layers including four outer and four intermediate yoke laminations and outer and center leg laminations connecting the ends of said yoke laminations together to form six substantially rectangular windows, said center leg laminations of each layer being disposed in side by side relation to provide a leg member having a width substantially twice the width of the outer leg laminations, said plurality of layers being divided into groups each including at least three layers, the joints between the adjoining edges of the laminations in two of the layers in each group at each corner of said core structure being substantially perpendicular with respect to the first direction of orientation of the strip material from which one of the meeting laminations is formed and substantially perpendicular to one another, the joints between the adjoining edges of the laminations in the third layer of each group at each of said corners, being diagonal with respect to the sides of said strip material, the joints between the corresponding adjoining edges of the intermediate yoke laminations and the associated leg laminations in the layers of each group being generally V-shaped in two of said layers and displaced from one another and substantially perpendicular to the first direction of orientation of the strip material of said yoke laminations in the third layer of said group, the joints between the adjoining edges of the laminations in each of said layers of each group being overlapped by the laminations in each of the adjacent layers, the layers of each group being stacked in a repeated sequence.

15. In a magnetic core structure, the combination comprising, a plurality of stacked layers of laminations formed from magnetic strip material having a first preferred direction of orientation lengthwise of said strip material, and a second preferred direction of orientation substantially perpendicular to the longitudinal dimension of said strip material, each layer including at least four laminations assembled around a substantially rectangular window, said plurality of layers being divided into groups each including at least three layers, the lines of junction between the adjoining edges of the laminations in two of the layers in each of said groups at each corner of said core structure being substantially perpendicular to the lengthwise dimension of said strip material of one of the adjoining laminations and perpendicular to each other, the lines of junction between the adjoining edges of the laminations of the third layer of each group at each corner of said core structure being at an oblique angle of substantially 45° with respect to the lengthwise dimension of said strip material, the lines of junction between the laminations of each of the layers of each group being overlapped by the laminations in the adjacent layers.

16. In an electrical apparatus, a magnetic core structure comprising a plurality of stacked layers of laminations formed from magnetic strip material having a first preferred direction of orientation substantially parallel to the sides of said strip material and a second preferred direction of orientation substantially perpendicular to the longitudinal dimension of said strip material, each of said layers including three leg laminations and yoke laminations connecting the ends of said leg laminations to form a substantially rectangular core having two substantially rectangular windows, said plurality of layers being divided into groups each including at least three layers, the joints between the adjoining edges of the laminations in two of the layers of each group at each corner of said core structure being substantially perpendicular with respect to the first direction of orientation of the strip material from which one of the meeting laminations is formed and substantially perpendicular to each other, the joint between the adjoining edges of the laminations in the third layer of each group at said corner being diagonal at an angle of substantially 45° with respect to the sides of said strip material, the joints between the adjoining edges of the laminations in each of the layers of each group being overlapped by the laminations in each of the adjacent layers.

17. In a magnetic core structure, the combination comprising, a plurality of stacked layers of laminations formed from magnetic strip material having a first preferred direction of orientation substantially parallel to the sides of said strip material and a second preferred direction of orientation substantially perpendicular to the longitudinal dimension of said strip material, each of said layers including at least one intermediate and two outer leg laminations and yoke laminations connecting the ends of said leg laminations to form a substantially rectangular core having at least two substantially rectangular windows, said plurality of layers being divided into groups each including at least three layers, the joints between the adjoining edges of the laminations in two of the layers of each group being diagonal with respect to the sides of said strip material at two diagonally opposite corners of said core structure and substantially perpendicular with respect to the first direction of orientation of the strip material from which one of the meeting laminations is formed at the other two diagonally opposite corners of each of said two layers, the joints between the adjoining edges of the laminations of the third layer of each group at each of the corresponding corners of said core structure being substantially perpendicular with respect to the perpendicular joints of the other two layers in said group, the joints between the adjoining edges of said intermediate leg and yoke laminations in the layers of each group being divided into two planes which are disposed at an angle of substantially 45° with respect to the first direction of orientation of the strip material of said leg laminations and perpendicular to each other, two planes which are displaced from and parallel to each other and to the latter direction of orientation, and one plane which is perpendicular to the latter direction of orientation, the joints between the adjoining edges of the laminations in each of said layers being overlapped by the laminations in the adjacent layers.

18. In a magnetic core structure, the combination comprising, a plurality of stacked layers of laminations formed from magnetic strip material having a first preferred direction of orientation substantially parallel to the sides of said strip material and a second preferred direction of orientation substantially perpendicular to the longitudinal dimension of said strip material, each of said layers including at least one intermediate and two outer leg laminations and yoke laminations connecting the ends of said leg laminations to form a substantially rectangular core having at least two substantially rectangular windows, said plurality of layers being divided into groups each including at least three layers, the joints between the adjoining edges of the laminations in two of the layers of each group being diagonal with respect to the sides of said strip material at two diagonally opposite corners of said core structure and substantially perpendicular with respect to the first direction of orientation of the strip material from which one of the meeting laminations is formed at the other two diagonally opposite corners of each of said layers, the joints between the adjoining edges of the laminations of the third layer of each group at each of the corresponding corners of said core structure being substantially perpendicular with respect to the perpendicular joints of the other two layers in said group, the joints between the adjoining edges of said intermediate leg and yoke laminations in the layers of each group being divided into two planes which are disposed at an angle of substantially 45° with respect to the first direction of orientation of the strip material of said leg laminations and perpendicular to each other, two planes which are displaced from and parallel to each other and to the latter direction of orientation, and one plane which is perpendicular to the latter direction of orientation, the joints between the adjoining edges of the laminations in each of said layers being overlapped by the laminations in the adjacent layers, the layers of each of said groups being stacked in a recurring order.

19. In an electrical apparatus, a three-phase magnetic core structure of the shell form type comprising a plurality of layers of laminations formed from magnetic strip material having a first preferred direction of orientation substantially parallel to the sides of said strip material and a second preferred direction substantially perpendicular to the longitudinal dimension of said strip material, each of said layers including four outer and four intermediate yoke laminations and outer and center leg laminations connecting the ends of said yoke laminations together to form six substantially rectangular windows, said center leg laminations of each layer being disposed in side by side relation to provide a leg member having a width substantially twice the width of the outer leg laminations, said plurality of layers being divided into groups each including at least three layers, the joints between the adjoining edges of the laminations in two of the layers in each group at each corner of said core structure being substantially perpendicular with respect to the first direction of orientation and substantially parallel to the second direction of orientation of the strip material from which one of the meeting laminations is formed and substantially perpendicular to one another, the joints between the adjoining edges of the laminations in the third layer of each group at each of said corners being diagonal with respect to the sides of said strip material, the joints between the corresponding adjoining edges of the intermediate yoke laminations and the associated leg laminations in the layers of each group being generally V-shaped in two of said layers and displaced from one another and substantially perpendicular to the first direction of orientation of the strip material of said yoke laminations in the third layer of said group, the joints between the adjoining edges of the laminations in each of said layers of each group being overlapped by the laminations in each of the adjacent layers.

References Cited in the file of this patent

UNITED STATES PATENTS

| | | |
|---|---|---|
| 1,404,826 | Alden | Jan. 31, 1922 |
| 2,300,964 | Putman | Nov. 3, 1942 |

FOREIGN PATENTS

| | | |
|---|---|---|
| 127,691 | Sweden | Mar. 21, 1950 |
| 699,549 | Great Britain | Nov. 11, 1953 |